S. K. LICHTENSTEIN & G. LISPENARD.
COTTON GIN.
APPLICATION FILED MAR. 4, 1912.
1,063,985.
Patented June 10, 1913.
2 SHEETS—SHEET 2.
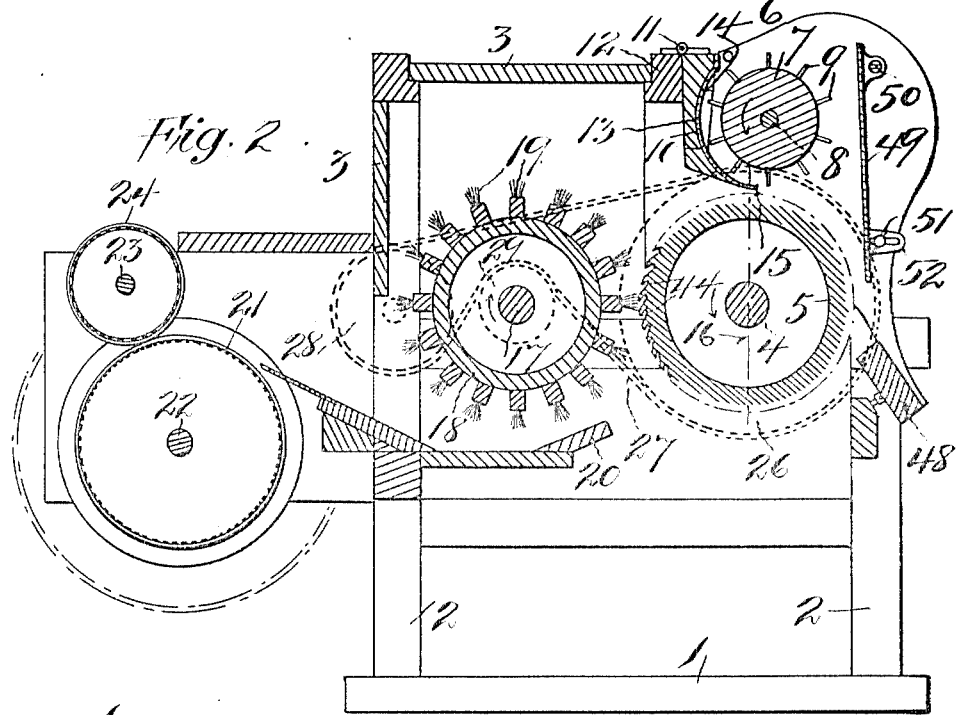
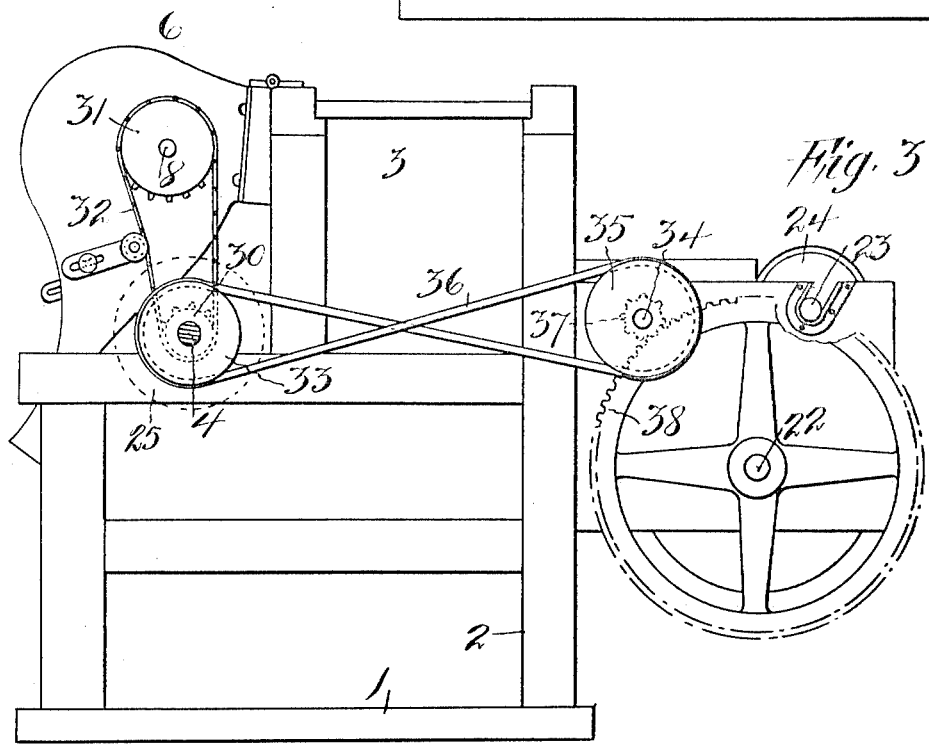

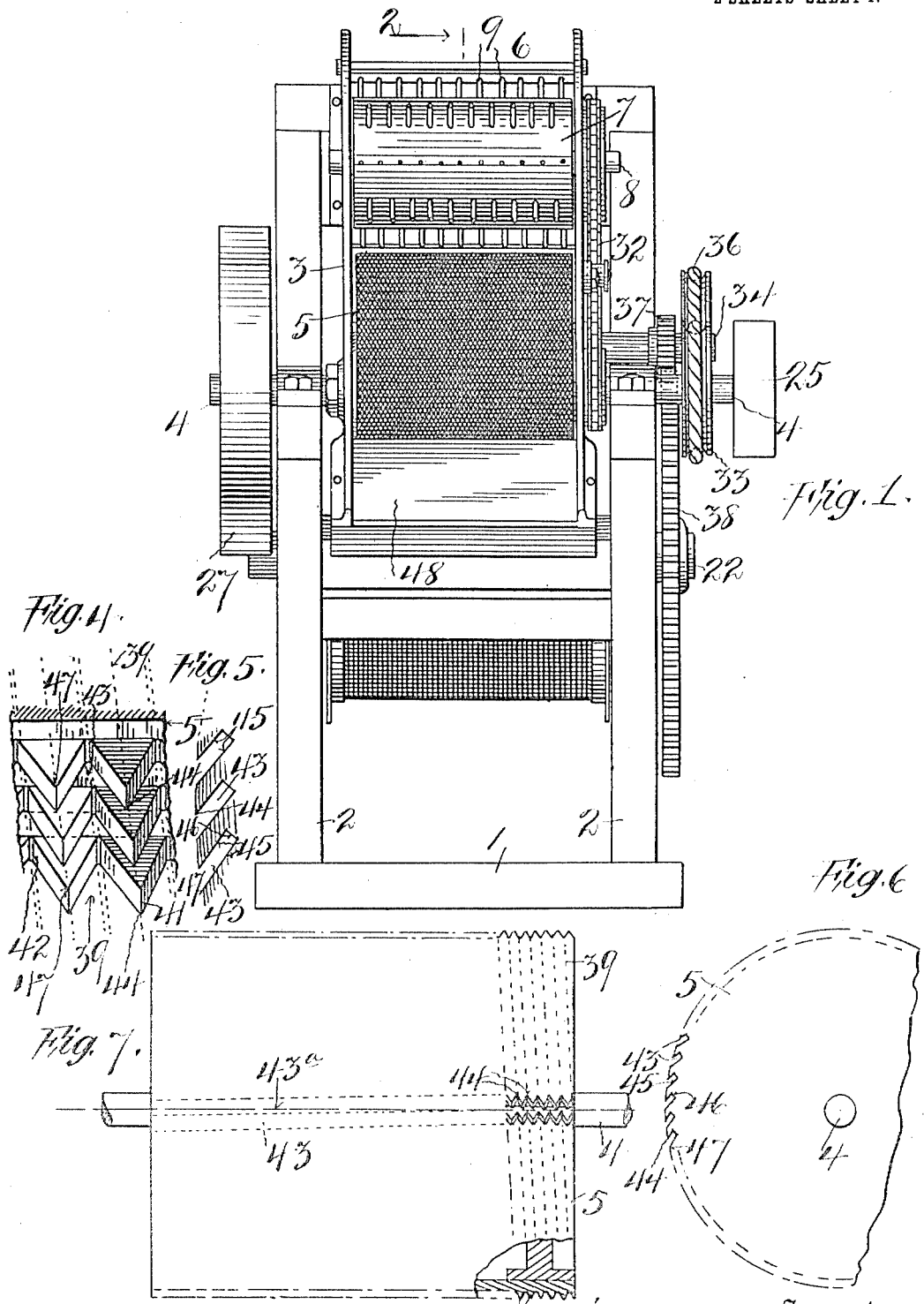

UNITED STATES PATENT OFFICE.

SOLOMON K. LICHTENSTEIN AND GEORGE LISPENARD, OF NEW YORK, N. Y., ASSIGNORS TO SOLOMON K. LICHTENSTEIN, TRUSTEE, OF NEW YORK, N. Y.

COTTON-GIN.

1,063,985.  Specification of Letters Patent.  Patented June 10, 1913.

Application filed March 4, 1912. Serial No. 681,541.

*To all whom it may concern:*

Be it known that we, SOLOMON K. LICHTENSTEIN and GEORGE LISPENARD, citizens of the United States, residing, respectively, in the city, county, and State of New York, and in the city of New York, borough of Brooklyn, county of Kings, and State of New York, have invented certain new and useful Improvements in Cotton-Gins, of which the following is a specification.

The object of our invention is to provide a cotton gin which will more rapidly gin the cotton and without injuring the staple by abrasion or by cutting or shortening the length of the fiber.

Another object of our invention is to provide a gin which will have a greater capacity than gins heretofore used.

Efforts to improve the cotton gin have been principally devoted to the improvement of what is generally known as the saw gin, that is, a gin in which a number of circular saw members are united to form a revoluble unit wherein the individual saws are sufficiently spaced apart to permit the seeds to fall between the several saws as the cotton gradually is removed from the seeds so that the seeds when deprived of their cotton by the coöperation of the teeth of the saw and suitable opposing ribs move downwardly upon suitable members interposed between the several saws and are discharged from the ginning cylinder in one direction while the cotton is carried in another direction by the saw teeth and finally discharged over a mote board by the action of a revoluble brush. There are many objections to a cotton gin of this character one of which is that the rapidly revolving saws injure the cotton fiber by cutting it more or less, thus reducing the length of the staple. Another objection to the gin of this character is that the construction of the ginning cylinder is comparatively heavy; and cannot be operated at a very high rate of speed because of the cutting action of the saw teeth upon the cotton fiber. Furthermore the teeth of the saws are very apt to cut the seeds, thereby distributing portions of the seeds into the cotton.

The object of our present invention is to provide a ginning cylinder formed as a unit having an integral periphery provided with a circumferential groove forming a spiral thread between the several convolutions of the groove and having slots of a certain shape and character disposed substantially lengthwise of the cylinder, passing through the said thread and intersecting the said spiral groove. Where the slots cut through the thread there are formed a number of teeth the apices of which coincide with the periphery of the cylinder as defined by the top surface of the thread. By forming these teeth coextensive with the periphery of the cylinder there are no projections to injure the cotton seed nor the cotton fiber and they serve to remove the cotton from the seeds by a combing action rather than by a sawing action. In contradistinction to the saw gin the seeds in the present gin do not pass downwardly between the peripheral threads but are forced away by a beater which operates to beat the seeds away from the place where the ginning cylinder coöperates with the opposing bar to remove the cotton from the seeds. The cylinder slots are so formed that the teeth will rapidly remove the cotton from the seeds without cutting the staple and will readily release the cotton when acted upon by the brush coöperating with the ginning cylinder. For this purpose the longitudinal slots herein referred to are formed with parallel side walls so that the slots will be of uniform width substantially throughout their depth and in the preferred construction the bottom of the slot is disposed at such an angle as will provide the greatest amount of material at the base of the several teeth. Aside from the cheapness in the cost of manufacturing a cylinder of this character the same may be operated at a very high rate of speed without injuring the cotton fiber, so that the capacity of the gin will be much greater than in the saw gin. The present gin requires only about half the power to operate it as a saw gin of equal capacity.

Other advantages will be made more apparent by the detailed description hereinafter.

Features herein shown or described, but not claimed, form the subject matter of an application filed on the 21st day of August, 1912, which is serially numbered 716,131.

In the drawings forming a part of this application, Figure 1, is an end elevation of a cotton gin embodying our invention wherein the seed board is removed to show the arrangement of the ginning elements, Fig. 2, is a cross section of the same on the line 2—2 of Fig. 1, Fig. 3, is a side elevation of the gin showing the arrangement of the operating mechanism, Fig. 4, is a face view of a portion of the ginning cylinder, Fig. 5, is a sectional view of a portion thereof, Fig. 6, is an end view of the cylinder, and Fig. 7, is a face view thereof.

In the drawings we have shown a base 1, upon which are arranged upright standards 2, forming a supporting structure for the various parts of the ginning device: and there are various walls 3, for inclosing the several devices in the usual manner. On a shaft 4, journaled in the side walls of the gin is mounted the ginning cylinder 5, which may be of any desired length or diameter according to the desired capacity of the gin. Above the cylinder is arranged a feed box or hopper 6, to which the unseeded cotton is fed by any well known feeding device: and arranged in this feed box and preferably above the ginning cylinder is a device for forming a roll of the cotton and for removing the seeds as the cotton is ginned therefrom. This is here shown as a revoluble member 7, mounted upon a shaft 8, which is journaled in the side walls of the gin, and consists preferably of a body portion 7, having radially arranged projections or spokes 9, upon its periphery for engaging the cotton and the seeds. Above the ginning cylinder there is provided an opposing bar 10, which is shown hinged at 11, to a cross bar 12, of the gin frame, and preferably the bar 10, is lined with a metal plate 13. The inside 14 of the opposing bar, with which the cotton contacts, is arranged to conform generally with the shape of the beater 7, as defined by the several spokes 9, and for this purpose we form the side 14 of a curved or circular shape, in order that the beater will properly feed the cotton into contact with the surface of the ginning cylinder. It will be noted that while the opposing bar 10 lies generally to one side of the vertical axis of the cylinder 5, the edge 15, which comes near the periphery of the cylinder 5, passes to and preferably slightly beyond the other side of the vertical axis of the cylinder. In Fig. 2, the vertical axis of the cylinder is indicated by a dotted line 16 and it will be noted that the edge 15 of the opposing bar terminates to the right of this line, or on that side of the axis to which the seeds are driven away when their cotton has been removed therefrom, the purpose of which will be made more apparent in the description of the operation of the device.

The surface of the ginning cylinder is provided with ginning teeth as will be more specifically set forth hereinafter.

Upon a shaft 17, journaled in the side walls of the gin there is provided a brush 18, which is arranged so that the bristles 19, thereof contact with the periphery of the ginning cylinder beyond the opposing bar, for the purpose of removing the cotton lint from the ginning cylinder. Below the brush is arranged an ordinary mote board 20. The ginned cotton travels over the mote board under the propelling action of the brush 18, and the air current generated by the rapid revolution thereof, and is delivered upon the cylinder 21, forming part of a condenser. The wire covered cylinder 21, is mounted upon a shaft 22 which is journaled in the side walls of the gin: and upon a shaft 23, journaled in the side walls is mounted a coöperating roller 24, which, together with the roller 21, forms a condenser for condensing the cotton as it comes from the ginning cylinder.

The several shafts are operated by any suitable mechanism. We have shown mounted upon the shaft 4, of the ginning cylinder a pulley 25, to which power may be applied from any suitable source of power: and preferably the power for the other shafts is derived from the shaft 4. Arranged to travel over a pulley 26, on the cylinder shaft 4, is a belt 27, which travels over an idler 28 and over a pulley 29, on the shaft 17, which carries the brush: and the belt is arranged to engage the pulley 29, so as to operate the shaft 17, in a reverse direction to shaft 4. There is also arranged upon the shaft 4, a sprocket 30 and upon the shaft 8, of the beater is arranged a sprocket 31 over which sprockets travels an endless chain 32, whereby the operating force for the beater is derived from the shaft 4. Upon the shaft 4, there is also provided a grooved pulley 33; and upon a shaft 34, there is provided a similar grooved pulley 35: and over the pulleys 33, 35, travels an endless, crossed belt 36. Upon the shaft 34, there is also provided a pinion 37 which meshes with a gear 38, on the shaft 22 of the condenser roller 21. By this means the operating force for the condenser is derived from the shaft 4.

The above constitute the principal parts of a cotton gin.

The improved results are obtained principally by reason of the character of the ginning cylinder. The periphery of this cylinder 5, is formed preferably as a homogeneous unit and is grooved circumferentially to form circumferentially disposed peripheral projections preferably in the nature of a single thread disposed spirally about the cylinder and extending from end to end thereof so that the several convolutions of the thread lie substantially at right angles to the axis of the cylinder. For this purpose we cut in the periphery of the cylinder a groove 39, which is of greater width at the periphery of the cylinder and of gradually decreasing width toward the bottom of the groove; and this groove is disposed spirally around the cylinder and preferably extends from end to end thereof. Between the several convolutions of the groove there is formed a spiral thread 40, which defines the periphery of the cylinder. This thread is narrow at the top 41, and in fact preferably comes to almost a sharp edge; and it gradually increases in width toward the base 42, thereof. Preferably the base of one convolution of the thread is in immediate juxtaposition to that of the next one, throughout the cylinder. In addition to the above mentioned groove there are formed in the periphery of the cylinder a number of slots 43, which are cut through the thread 40, and intersect the groove 39; and these slots extend lengthwise of the cylinder and substantially parallel with the longitudinal axis thereof. The slots 43, form a tooth 44 at each intersection of a convolution of the thread and the shape and disposition of these slots have much to do with the results obtained. It will be observed that these slots 43 are formed with straight parallel side walls 45 so that the slots are of the same width substantially their whole depth; and the bottom 46, of the slot is cut at an angle as shown, whereby a greater amount of material will be provided at the base of the ginning teeth in order that such teeth will be strong even though they are formed close to each other around the circumference of the cylinder. By making the slots 43 with parallel side walls 45 the teeth 44 will be properly formed and the slot 43, may be comparatively narrow. This will leave a comparatively narrow opening between each tooth point 44, and the top point 47, of the opposite side of the slot 43.

The slots 43, are directed at an angle to the radius of the cylinder, passing through each particular slot, or, as may be said, at an angle to the radial planes of the cylinder. This causes the teeth 44, to slant, whereby they will take quick hold of the cotton when the cylinder is operated in one direction, and will release the cotton therefrom when acted upon by the brush 18. The thread 40 is very narrow at the top edge 41, and the slots 43, will therefore form picking teeth having points 44, which are coextensive with the periphery of the cylinder; and since these teeth do not extend beyond the periphery of the cylinder they will not injure the cotton fiber nor will they injure the cotton seeds because they cannot cut into the latter. This is especially so if the slot 43, is formed with parallel side walls 45, because then the space 43 may be made so narrow that the cotton seeds can not come into this space sufficiently to let the teeth 44, cut into them which latter are, on the contrary, kept upon the periphery of the thread 40.

When the several parts are set into operation, the several shafts will be revolved in the directions indicated by the arrows on the drawings. As cotton is fed into the hopper 6, it will be formed into a roll by the beater 7, the spokes 9, of which take into the soft cotton mass and revolve a portion of the cotton therewith. A portion of the cotton mass will be carried between the curved face 14, of the opposing bar and the cylindrical body of the beater and will be carried to the edge 15, of the opposing bar, when it will become subject to the ginning action of the cylinder 5. The cylinder 5, is preferably arranged close enough to the opposing bar so that the teeth 44 will clear the bar by a slight extent, say a fraction of an inch: sufficient to allow the teeth to carry the cotton beyond the opposing bar, but not enough to permit the seeds to pass. The teeth 44 of the rapidly revolving cylinder 5, will take hold of the cotton even though the pressure of the cotton upon the cylinder be very light and the cotton will be removed from the seeds by a combing action rather than by a cutting action, so that the staple in the ginned cotton will be substantially as long as that of the unginned cotton which is being fed into the machine. The teeth 44 by reason of their shape and arrangement take rapid hold of the cotton fiber and their ginning action is very rapid. The teeth do not remove the cotton from the seeds by a series of cuts, but comb the cotton off the seeds, by carrying the cotton therewith upon first engagement with it. Not only do the teeth, by reason of their shape and arrangement rapidly remove the cotton from the seeds, but when they carry the cotton beyond the opposing bar and are acted upon by the brush 18, revolving in a reverse direction to the cylinder 5, the cotton is very readily released from the teeth, quickly, and without injury to the cotton. The cotton is delivered by the brush 18 above the mote board 20, the motes dropping free of the mote board; and the cotton passes over the mote board to the condenser rollers 21, 24, in the well known manner.

The action of the teeth 44 tends to collect the many seeds at the edge 15 of the opposing bar and when stripped of their cotton they can not fall out between the thread 40, as they do between the several saws in a saw gin. As the cotton is removed from the seeds the latter are beaten away from the cylinder 5, by the action of the several spokes 9, which throw the seeds away from the opposing bar and ginning cylinder so that they fall upon the seed board 48, and drop into any suitable receptacle. The board 49, prevents the seeds from being driven out of the gin; and to permit the adjustment of this board relative to the ginning cylinder we have supported the same to rock upon studs 50; and the lower end may be adjusted toward and from the ginning cylinder by means of the thumb screw 51, which screws into the wall of the gin and engages in a slotted ear 52, of the board.

We have found that in using a ginning cylinder having a spiral thread upon its periphery there was a tendency of the thread to move the many seeds along the opposing bar and lengthwise of the cylinder, so that they collected at one end of the gin, according to whether the thread were a right or left thread: and there was a tendency to so move the seeds without their turning over, so that the ginning teeth did not have a chance to remove the cotton from all parts of the seeds. To avoid this we have directed the slots 43, so that they counteract this action. For this purpose the slots 43, extending lengthwise of the ginning cylinder are not parallel with the longitudinal axis thereof but cross lines on the periphery of the cylinder parallel with the longitudinal axis thereof, as will be apparent from Fig. 7. They are therefore arranged diagonally on the cylinder, although the angle need be very slight. The slots 43, being at an angle to the longitudinal axis of the cylinder the rows of teeth tend to move the seeds along the cylinder, to the right or left, as the case may be, while the thread 40, also tends to move the seeds along the cylinder but in a reverse direction to the action of the rows of teeth so that these elements oppose each other. The arrangement may be such that the seeds will not travel along the cylinder lengthwise and will be turned over, so that the ginning teeth will remove the cotton from all parts of the seeds. It is necessary that the thread be made spiral in order that the cotton shall be removed from all parts of all the seeds.

A cotton gin constructed in substantial accordance with the above will gin cotton faster than the saw form of gin and the cylinder may be revolved at a much greater speed without injuring the cotton or reducing the length of the staple, and without injuring the seeds.

We are aware that an attempt has been made to utilize a single unit cylinder having a thread formed with integral teeth, but so far as we are aware the teeth have never been so shaped and formed as to produce results similar to the present machine, nor are we aware that successful means have been employed to remove the seeds from a cylinder of such character.

Having described our invention what we claim is:—

1. A ginning cylinder for cotton gins, comprising a substantially circular revoluble member having its periphery grooved circumferentially and spirally to form a raised spiral thread said thread being wider at the base than at the top, said cylinder having substantially longitudinal slots cut in its periphery, and extending through the said thread and intersecting said groove, said slots forming ginning teeth in said thread, the said slots being defined by parallel side walls.

2. A ginning cylinder for cotton gins comprising a substantially circular revoluble member having its periphery grooved circumferentially and spirally to form a raised spiral thread substantially at right angles to the longitudinal axis of the cylinder, said thread being wider at the base and gradually decreasing in width toward the top, said cylinder having substantially longitudinal slots in its periphery and extending through the said thread and intersecting said groove, said slots forming pointed ginning teeth having their points coextensive with the periphery of the thread, the said slots being defined by straight parallel side walls whereby the said slots will be of uniform width substantially throughout their depth and having an inclined bottom 46, whereby the said teeth will have their greatest material at their bases.

3. A ginning cylinder for cotton gins, comprising a substantially circular member having its periphery grooved circumferentially by a spiral groove to form a raised thread substantially at right angles and spirally to the longitudinal axis of the cylinder, said thread being wider at the base and regularly decreasing in width toward the top, said cylinder having substantially longitudinal slots in its periphery, extending through the said thread and intersecting said groove, said slots extending inwardly from the periphery of the cylinder at an angle to the radial planes of said cylinder, said slots forming pointed teeth in said thread coextensive with the periphery of the cylinder, said slots being defined by straight, parallel, side walls.

4. In a cotton gin, an opposing bar and a ginning cylinder coöperating therewith to gin cotton, said cylinder comprising a revoluble substantially round member, grooved circumferentially to form a spiral thread extending from its periphery substantially at right angle to the longitudinal axis of the cylinder, said cylinder having slots arranged lengthwise thereof, cutting the said thread to form picking teeth and intersecting said groove, said slots being arranged to cross a line parallel with the longitudinal axis of the cylinder whereby the rows of teeth will be arranged diagonally of the cylinder.

Signed at the city, county and State of New York, this 1st day of March, 1912.

SOLOMON K. LICHTENSTEIN.
GEORGE LISPENARD.

Witnesses:
HENRY M. WISE,
ARTHUR S. FRIEND.